United States Patent [19]

Studinka et al.

[11] 4,414,031

[45] Nov. 8, 1983

[54] FIBER-CONTAINING PRODUCTS MADE WITH HYDRAULIC BINDER AGENTS

[75] Inventors: Josef Studinka, Zürich; Peter E. Meier, Wädenswil, both of Switzerland

[73] Assignee: Ametex AG, Niederurnen, Switzerland

[21] Appl. No.: 359,943

[22] Filed: Mar. 19, 1982

[30] Foreign Application Priority Data

Mar. 20, 1981 [CH] Switzerland .................... 1919/81

[51] Int. Cl.³ ............................................. C04B 31/34
[52] U.S. Cl. ........................................ 106/90; 106/99; 106/111; 106/116
[58] Field of Search ................... 106/99, 90, 111, 116

[56] References Cited

U.S. PATENT DOCUMENTS

| | | | |
|---|---|---|---|
| 3,044,547 | 7/1962 | Jarboe | 106/99 |
| 3,368,623 | 2/1968 | Carter et al. | 106/99 |
| 4,021,258 | 5/1977 | Vogabehi | 106/99 |
| 4,033,781 | 7/1977 | Hauser et al. | 106/99 |

*Primary Examiner*—James Poer
*Attorney, Agent, or Firm*—Bernard, Rothwell & Brown

[57] ABSTRACT

To reinforce products made from hydraulic binder agents, fibers of polymerized acrylic nitrile, which are manufactured with a molar concentration of acrylic nitrile units of at least 98%, are used. The fibers advantageously have a strength of at least 50 cN/tex and a breaking elongation of at most 15%. These fibers produce a product after setting having good bending tensile strength and excellent impact strength.

21 Claims, No Drawings

FIBER-CONTAINING PRODUCTS MADE WITH HYDRAULIC BINDER AGENTS

BACKGROUND OF THE INVENTION

1. Field of the Invention

The present invention relates to fiber-containing products produced with hydraulic binder agents characterized in that they contain fibers of polymerized acrylic nitrile having a molar concentration of acrulic nitrile units of from 98 to 100% as reinforcing fibers and/or fillers.

The invention further relates to a method for the manufacture of such products.

2. Description of the Prior Art

Among common construction materials, fiber-reinforced cement products, beginning with asbestos and cement, have been known for decades. In the asbestos cement industry the manufacturing methods most commonly used are those in accordance with the wrapping method of L. Hatschek (AT-PS No. 5970). The technology of this production method is described in detail for example in the book by Harald Klos, *Asbestos Cement*, Springer Verlag, 1967.

This known method for the manufacture of items such as asbestos cement pipes and plates is based on the use of circular screen machines. In accordance with this process a thinned asbestos cement suspension is applied in the form of a fleece onto a layer of felt by means of a material frame and a screen cylinder and with the aid of sizing rollers or pipe cores this conglomerate is wound up to the desired thickness. For the manufacture of corrugated plates the asbestos cement fleece can be cut from the sizing rollers after it has attained the desired thickness and it can then be allowed to harden between oiled corrugated sheets.

In recent years it has become apparent that the proven asbestos will no longer be available in unlimited quantities and must be included as one of the natural materials whose supply will presumably be depleted most quickly. The deposits of minable asbestos, furthermore, are distributed among only a few countries, which can in turn lead to undesired dependencies, which is being manifested even today in rising prices.

It is therefore desirable to use new fibers as reinforcement fibers and filler material for hydraulic binder agents, such as for cement reinforcement. These new fibers must be suitable to produce fiber-containing products having the desired mechanical characteristics on the production equipment already distributed through the manufacturing industry, such as the asbestos cement industry.

SUMMARY OF THE INVENTION

In accordance with the present invention, solid, fiber-containing products manufactured with hydraulic binder agents are characterized in that they contain fibers of polymerized acrylic nitrile as reinforcement fibers having a molar concentration of acrylic nitrile units of from 98 to 100%, which maintain their strength characteristics during and after the setting process. The invention further comprises a method of producing the above-mentioned products.

DETAILED DESCRIPTION OF THE PREFERRED EMBODIMENT

For the sake of simplicity, in the present specification cement will be referred to as the preferred binder agent. However, any other hydraulically setting binder agent can be employed in place of cement. Among the suitable hydraulically setting binder agents are materials containing an inorganic cement and/or an inorganic binder or adhesive agent which is hardened by hydration. Particularly well-suited binder agents hardened by hydration are, for example, Portland cement, clay-fusion cement, iron Portland cement, trass cement, blast furnace cement, gypsum, the calcium silicates produced in autoclave treatment, as well as combinations of these individual binder agents.

Various fillers and additives are often added to the binder agents which have, for instance, a positive influence on the pore structure of a concrete block, or can improve the drainage behavior of the paste mixture on the drainage machines. Examples of such additives are materials such as light ash, siliceous dust, quartz powder, crushed stone, kaolin, blast furnace slag, pozzolana, etc.

Innumerable publications are already found in literature concerning the use of various natural, synthetic, organic and inorganic fibers. Among other things, wool, cotton, silk, polyamide, polyester, polyacrylic nitrile, polypropylene and polyvinyl alcohol fibers have already been tested as reinforcement for cement. Work with glass, steel, aramide and carbon fibers is also known. Of all these fibers, thus far none has proven satisfactory in practice, particularly in cement.

The demands placed on fibers suited for reinforcement of cement and other hydraulically setting binder agents are extremely high:

Among the chemical demands, primarily the alkali resistance in saturated calcium hydroxide solutions at raised temperatures is an absolute requirement. Concerning the chemical make-up of a suitable fiber, it can be said that the concentration of polar functional groups present should be as high as possible, so that a satisfactory affinity with the cement is achieved.

Furthermore, the physical fiber data should agree with the physical data of the hydraulic binder agent in the important characteristics. With cement it is known that this material exhibits a certain brittleness and can break, for example, at an extension of as little as 0.3%. For reinforcing fibers in cement it has been shown that fibers have the best reinforcing effect that oppose a minimal extension with the greatest force. It must be noted in this regard, however, that the characteristics of fibers treated with an aqueous cement paste can change, and it cannot be foreseen to what degree such a change can occur. This means that despite good original mechanical values of a fiber, when in the cement they may not achieve the expected effect if the fiber characteristics change during the hydration processes of the cement.

In addition to these described physical characteristics of fibers it is also important that the fibers can be well dispersed in a thinned, aqueous cement paste and also remain uniformly distributed when further additives are included when these fibers are meant to be processed to form fiber cement products by drainage methods. Fibers or fiber mixtures in the length range up to 30 mm have been proven, whereby the fiber sections can be of uniform length, for example in lengths from 3 to 24 mm, or may be employed with mixed lengths. In certain cases it has proven to be advantageous to pretreat the fibers with a cutting and/or fibrillating milling process.

Suitable for use as the fiber material are fibers having a titer of from 0.1 to 15 dtex, and particularly from 0.5 to 15 dtex.

When the commercially available fibers are tested according to the above-mentioned characteristics, all known textile fiber types such as polyester, polyacrylic nitrile, polyamide, viscose, cotton and wool fibers are eliminated, because their mechanical behavior differs too much from that of the hydraulically setting binder agent.

High strength organic fibers based on polyester, polyvinyl alcohol or rayon, such as are employed, for example, in the tire industry, are indeed superior in their mechanical characteristics to the textile fiber types. These valuable characteristics, however, are severely reduced under the wet alkaline processing conditions in the manufacture of fiber cement. Other high performance fibers known in this area of technology, such as glass fibers, carbon fibers and aramide fibers are either also not alkaline resistant or are not economical, and in addition their affinity to the cement matrix leaves something to be desired. For use as cement reinforcing fibers they must therefore be disregarded.

It is therefore the goal of the invention to employ a fibrous material which opposes even a slight extension with the highest possible resistance force, is changed as little as possible by a cement paste and after setting gives the cement-fiber combination increased mechanical strength.

It is known that polyacrylic nitrile fibers are among the most widely distributed fibers having polar functional groups. These fibers are produced in large quantities and are used primarily in the clothing sector. With all current commercially available types of polyacrylic nitrile fibers, however, it has not been possible to achieve a sufficient reinforcing effect for hydraulically setting binder agents. The cause may well be sought in the relatively low strength and high breaking elongations of these fibers. All common commercial polyacrylic nitrile fibers, in order to improve the color adhesion, the textile grip and to simplify the fiber formation process, contain from 4 to 15% of one or more comonomers, such as vinyl acetate, methyl acrylate, methyl methacrylate and vinyl derivatives containing carboxyl, sulfo or pyridine groups. It is possible, however, to improve the mechanical characteristics of these fibers to a certain degree, i.e. to reduce the breaking elongation and increase the strength. This can be accomplished by the optimization of the stretching process of the fibers after the fiber formation process behind the spinning nozzle, as best known among fiber manufacturers. However, practical limits are set for this optimization by the inherent characteristics of the fiber materials. If a cement matrix is reinforced with such fibers, it does indeed demonstrate a certain, although still unsatisfactory improvement of the reinforcing effect as compared to a cement matrix with the above-mentioned conventional acrylic fibers.

It has now been surprisingly discovered polyacrylic nitrile fibers can be used for the desired purpose, in the manufacture of which a polymer is used having a molar concentration of at least 98% acrylic nitrile units and a relative viscosity of at least 2.60 (measured as a 0.5% solution in dimethyl formamide). Such fibers, when used in cement, are superior to other high strength polyacrylic nitrile fibers having the above-described conventional composition, in that they maintain their original characteristics in the aqueous-alkaline cement paste, particularly their strength characteristics, such as, for example a high A-modulus of, for example, the range of from 1000 cN/tex to 2000 cN/tex.

The objects of the invention, therefore, are solid, fiber-containing products produced with hydraulic binder agents which are characterized in that they contain fibers of polymerized acrylic nitrile having a molar concentration of acrylic nitrile units of from 98 to 100% as reinforcing fibers and/or fillers.

It is advantageous for the fibers thus used to be pretreated in accordance with the method according to Swiss Patent Application No. 1297/79-0 (DE-OS No. 30 02 484), which is hereby declared to be fully incorporated by reference in the present specification.

The fibers used in accordance with the present invention, which can if desired by employed together with other fibers, are advantageously mixed in such quantity that the total fiber proportion in the set product is from 0.1 to 30 percent by weight, and preferably from 1 to 12 percent by weight, and used as pure reinforcement it is advantageous for the proportion to be from 1 to 8% by weight. The fibers are generally used in the length range of up to 30 mm, whereby the fiber sections can be uniform, for example in lengths of from 3 to 24 mm, or may be used with mixed lengths. In certain cases it has proven advantageous to pretreat the fibers with a cutting and/or fibrillating milling process.

Suitable fiber materials are fibers having a titer of from 0.1 to 15 dtex, and particularly from 0.5 to 15 dtex.

The manufacture of such fibers into products according to the invention takes place by known methods, after mixing the binder agent from water and the usual auxiliary and additive materials, as defined in patent claim 9, for example on a Hatschek machine, as described above.

The manufacture of the fibers according to the invention is not the object of the present patent application. It takes place, for example, according to a known drying method, or preferably, according to a wet spinning method. These high-strength fibers having low breaking elongations can be manufactured, for example, as follows:

700 g of a polymer of 99.5% acrylic nitrile and 0.5% acrylic acid methyl ester having a relative viscosity of 2.85 (measured as a 0.5% solution in dimethyl formamide (DMF)) was dissolved in 8300 g DMF to a homogeneous spinning solution. This solution was filtered at 16.2 ml/min through a one hundred hole nozzle, hole diameter 0.06 mm, and then forced into a precipitate bath consisting of 50% DMF and 50% water and having a temperature of 50° C.

After a submersion length of 50 cm at a speed of 5.5 m/min, the obtained fibers were racked. In two successive stretching baths consisting of 60% DMF and 40% water they were stretched at 29.3 m/min at a temperature of 99° C., washed in water in additional baths, brightened and then dried on two heated roll stands having surface temperatures of 140° and 185° C., respectively, while allowing shrinkage of 0.7 m/min. The length of time the fiber remains on the first roll stand having a temperature of 140° C. was selected such that the fiber was shiny as it left the stand and no longer exhibited vacuoles. The fiber was drawn from the second roll stand at 33.3 m/min and stretched with the aid of an unheated roll stand over four heated plates which alternately contacted the fiber from above and beneath at temperatures of 145°, 145° 165° and 180° C., respectively, up to 95 m/min. The fiber was then coiled on spools. The effective total stretch ratio was 1:17.3, and the mechanical characteristics of the thus-obtained fibers (type A) are compiled in table I.

Especially suitable fiber types can be obtained by using an additional fixing treatment, for example with the use of hot contact surfaces, hot air, hot water, steam, etc., after the contact stretching.

For the fibers of Type B as used in the following exemplary embodiment, the fixing was performed on two heated roll stands without allowing any shrinkage. The surface temperature of the stands was 210° and 230° C., respectively. The textile-mechanical data of these fibers are listed in table I. By means of the fixing treatment the heat shrinkage was reduced from 9.5% to 2.0%.

After the above-described spinning process (variation A), an additional polymer according to the invention having 99% acrylic nitrile units and 1% acrylic acid methyl ester units with a relative viscosity of 2.84 (Type C) was made into fiber, together with, as a control, a conventional polymer having 96% acrylic nitrile units and 4% acrylic acid methyl ester units and a viscosity of 2.78 (Type D). As a further control comparison, in addition a common commercial polyacrylic nitrile fiber for textile purposes (Type E) was tested having the following composition: 93.5% acrylic nitrile units, 6% acrylic acid methyl ester units and 0.5% methallyl sulfonate.

The mechanical characteristics of the acrylic nitrile having a molar concentration of at least 98% acrylic nitrile units, as employed in the invention, exhibit a sufficient alkali resistance, even at raised temperatures, to satisfy the demands mentioned at the outset.

4000 cm$^2$/g. This asbestos-cement paste was then transferred to the Hatschek machine via a stirring vat.

MIXTURES 2 THROUGH 4 AND COMPARISON EXAMPLES 5 THROUGH 7

80 kg of old paper (without any glossy paper) and 15 kg of aluminum sulfate were pulped in 1 m$^3$ of water for 10 minutes. This fibrous suspension was thinned to 2.5 m$^3$ and 20 kg of the polyacrylic nitrile fiber samples to be tested having lengths of 6 mm were added, whereupon the pulping continued for an additional 5 minutes. Subsequently, 45 kg of powdered calcium hydroxide was added and the mixture was pulped for an additional 12 minutes. After the mixture was pumped into a cement mixer, 1000 kg of cement having a specific surface area of approximately 3000 to 4000 cm$^2$/g was mixed in over a 15 minute period.

To improve the cement sticking behavior, 80 g of a polyacrylic amide ("Separan NP-10", Dow Chemical Corporation) in the form of a 0.2% aqueous solution was added to the fiber-cement paste. The thus-obtained mixture was then transferred via a stirring vat to a Hatschek machine.

The mixture 7 was produced only from old paper and cement, without polyacrylic nitrile fibers.

MANUFACTURE OF THE TEST PLATES

With the above mixtures 1 through 7, plates of 6 mm thickness were produced on a Hatschek machine with seven revolutions of the shaping roller. These plates were then pressed between oiled sheets for 45 minutes in a stack press at a specific compression of 250 bar to a thickness of 4.8 mm. The tests of the plates were per-

TABLE I

Mechanical characteristics of high strength polyacrylic nitrile fibers having various molar concentrations of acrylic nitrile (measured on individual fibers)

|  | Type A 99.5% AN | Type B 99.5% AN | Type C 99.0% AN | Type D 96.0% | Type E 93.5% AN |
|---|---|---|---|---|---|
| Test A* |  |  |  |  |  |
| Titer dtex | 2.9 | 2.9 | 2.9 | 2.9 | 2.9 |
| Strength cN/tex | 83 | 74 | 82 | 85 | 35 |
| A-modulus cN/tex | 1490 | 1420 | 1510 | 1410 | 1100 |
| Breaking elongation | 8.0 | 10.0 | 8.1 | 7.9 | 20 |
| Test B** |  |  |  |  |  |
| Strength cN/tex | 81 | 74 | 80 | 70 | 23 |
| A-modulus cN/tex | 1400 | 1350 | 1490 | 810 | 630 |
| Breaking elongation | 9.1 | 10.8 | 8.3 | 12.0 | 35 |

Test A*:
Individual fiber tests under normal conditions, 20° C., 65% relative humidity.
Test B**:
To test the cement environment resistance, before the normal test in accordance with "A", the fibers were immersed for 24 hours at 80° C. in an aqueous paste of so-called Portland cement in 1 liter of water and subsequently conditioned for the test A.

For the evaluation of these five fiber types with regard to their suitability as reinforcing fibers in cement, the following examples and comparison tests were compared under analogous conditions, as described below.

PRODUCTION OF THE MIXTURES FOR MANUFACTURE ON A HATSCHEK MACHINE

(Mixture 1 (comparison example)

In a pug mill 153 kg of asbestos (grage 4: grade 5=1:3) was milled for 30 minutes with 62 liters of water. The broken-down asbestos was then placed in a rapidly moving vertical mixer containing 1.5 m$^3$ of water. After stirring for ten minutes, the mixture was pumped into a horizontal mixer and 1 ton of cement was added, having a specific surface area of from 3000 to formed after a setting period of 28 days, after which the plates were wetted for an additional 3 days. The test results are compiled in Table II.

TABLE II

Test Results of Platelets of Cement Reinforced with Polyacrylic Nitrile Fibers

| Mix No. | Bending Tensile Strength N/mm$^2$ | Specific Impact Strength N/mm/mm$^2$ | Plate Density g/cm$^3$ |
|---|---|---|---|
| (1) Asbestos (Comparison Example) | 29.2 | 1.8 | 1.76 |
| (2) PAN fibers Type A with 99.5% acrylic nitrile units | 26.3 | 2.7 | 1.76 |
| (3) PAN fibers Type A | 26.2 | 2.7 | 1.77 |

TABLE II-continued

Test Results of Platelets of Cement Reinforced with Polyacrylic Nitrile Fibers

| Mix No. | Bending Tensile Strength N/mm² | Specific Impact Strength N/mm/mm² | Plate Density g/cm³ |
|---|---|---|---|
| with 99.5% acrylic nitrile units, fixed | | | |
| (4) PAN fibers Type C with 99.0% acrylic nitrile units | 25.9 | 2.6 | 1.74 |
| (5) PAN fibers Type D (Comparison Example) with 96.0% acrylic nitrile units | 21.8 | 2.7 | 1.76 |
| (6) PAN fibers Type E (Comparison Example) with 93.5% acrylic nitrile units | 20.2 | 2.6 | 1.75 |
| (7) Cellulose-cement mixture without PAN fibers (Comparison Example) | 18.5 | 2.2 | 1.74 |

The bending tensile strengths of the fiber-reinforced cement platelets demonstrate that with the use of polyacrylic nitrile fibers having largely uniform original mechanical values, surprisingly only the polyacrylic nitrile types used in accordance with the invention, Type A and Type B with 99.5% acrylic nitrile units and Type C with 99.0% acrylic nitrile units produce a significant contribution to reinforcement in a cement matrix. The specific impact strength is not influenced by the type of polyacrylic nitrile fibers used. The specific impact strength of the asbestos cement platelets is far exceeded by those of the fiber cement platelets. For practical use, in addition to the impact strength, the bending tensile strength is also of decisive importance. As can be seen from the above table, the fibers used in accordance with the invention yield significantly higher values than the comparison fibers Type D and Type E.

In other test samples it is shown how the fibers used in accordance with the invention also prove themselves in different fiber dimensions and in combination with common filler materials. The tests were performed exactly as already described for the mixtures 2 through 7, whereby the additional filler materials were added to the cement mixer after the cement had been added. The fibers used in accordance with the invention were incorporated as follows:

| Mixture 8 | |
|---|---|
| Portland Cement | 81.5% |
| Silica Filter Dust (SiO₂ content = 98.8% average particle size = 0.5μ) | 12.0% |
| Cellulose Fibers (45° SR) | 4.0% |
| PAN Fibers Type B: | 2.5% |

These fibers were previously cut to 18 mm and then further ground up by means of a cutting mill ("Condux" Type CS 500/600-4). This resulted in the following fiber length distribution:

| 4 mesh | 10.2% |
| 14 mesh | 19.6% |
| 35 mesh | 33.2% |
| 100 mesh | 26.9% |
| 200 mesh | 9.7% |
| 200 mesh | 0.4% |

("mesh" means here: mesh/inch).

| Mixture 9 | |
|---|---|
| Portland Cement | 82% |
| Blast Furnace Slag | 8% |
| Rock Wool | 4% |
| PAN Fibers/Cellulose Mixture | 6% |

3 parts PAN fibers, manufactured according to variation A with a content of 98 mole-percent acrylic nitrile units having a length of 8 mm were preliminarily milled together with 2 parts sulfate cellulose in a ball mill so as to become fibrillated. This mixture was added in a quantity of 6%.

The two mixtures 8 and 9 were handled as described above on a Hatschek machine to form test plates and were tested after 28 days of setting. The results are compiled in Table III.

TABLE III

Test Results of Platelets Made of Cement Reinforced with Polyacrylic Fibers and Containing Filler Material

| Mix No. | Bending Tensile Strength N/mm² | Specific Impact Strength N/mm/mm² | Density of Plates g/cm³ |
|---|---|---|---|
| (8) | 26.4 | 2.3 | 1.76 |
| (9) | 26.6 | 2.4 | 1.85 |

The results in Table III demonstrate that the fibers used in accordance with the invention yield good strength values even when differently spread out and in combination with various additives. While mixture 8 can be worked easily, mixture 9 allows higher densities to be achieved.

We claim:

1. Solid, fiber-containing products manufactured with hydraulic binder agents, characterized in that they contain fibers of polymerized acrylic nitrile as reinforcement fibers having a molar concentration of acrylic nitrile units of from 98 to 100%, which maintain their strength characteristics during and after the setting process.

2. Product according to patent claim 1, characterized in that the fibers have a strength of at least 50 cN/tex and a breaking elongation of at most 15%.

3. Product according to patent claim 1, characterized in that the fibers have a uniform length of from 3 to 24 mm.

4. Product according to patent claim 1, characerized in that the fibers have a non-uniform length range of up to 30 mm.

5. Product according to claim 1, characterized in that the fibers have a titer of from 0.1 to 15 dtex.

6. Product according to claim 1 in the form of plates, corrugated plates, pipes and shaped elements, particularly those intended for construction purposes.

7. Method for the manufacture of the products according to patent claim 1, characterized in that the hydraulic binder agent is mixed together with water, the usual supplemental and additive materials and with fibers of polymerized acrylic nitrile having a molar concentration of acrylic nitrile units of from 98 to 100% as reinforcing fibers which maintain their strength characteristics during and after the setting process, and in that the mixture is then partially drained, if desired, and brought into the desired shape and allowed to set.

8. Method according to patent claim 7, characterized in that the fibers have a strength of at least 50 cN/tex and a breaking elongation of at most 15%.

9. Method according to patent claim 7, characterized in that the fibers have a uniform length of from 3 to 24 mm.

10. Method according to patent claim 7, characterized in that the fibers have a nonuniform length range of up to 30 mm.

11. Method according to claim 7, characterized in that the fibers are stretched multiple times.

12. Method according to patent claim 9, characterized in that the fibers are first treated by a fibrillating milling process.

13. Method according to claim 8, characterized in that the fibers have a titer of from 0.1 to 15 dtex.

14. Method according to claim 8, characterized in that the mixture is partially drained prior to the shaping.

15. Method according to claim 8, characterized in that the mixture is formed into plates, corrugated plates, pipes and shaped elements, particularly intended for construction purposes.

16. Product according to claim 4, characterized in that the fibers are first treated by a fibrillating milling process.

17. The method of claim 10 wherein the fibers are first treated by a fibrillating milling process.

18. The method of claim 7 wherein the fibers are stretched multiple times and then thermo-fixed.

19. The method of claim 14 wherein the method of drainage is selected from the group consisting of the winding machine method, circular screen method, longitudinal screen method, injection system method and filter press method.

20. The method of claim 14 wherein the mixture is worked in accordance with a continuous single strand process.

21. The method of claim 8 wherein the mixture is worked in accordance with a continuous single strand process.

* * * * *

Notice of Adverse Decision in Interference

In Interference No. 101,498, involving Patent No. 4,414,031, J. Studinka and P. E. Meier, FIBER-CONTAINING PRODUCTS MADE WITH HYDRAULIC BINDER AGENTS, final judgment adverse to the patentees was rendered July 12, 1988, as to claims 1 - 21.

[*Official Gazette February 14, 1989.*]